United States Patent [19]

Norfolk

[11] 4,349,282
[45] Sep. 14, 1982

[54] TRANSDUCERS

[75] Inventor: Raymond W. Norfolk, Castleford, England

[73] Assignee: Spill-Fire Alarm Systems Ltd., London, England

[21] Appl. No.: 214,727

[22] Filed: Dec. 9, 1980

Related U.S. Application Data

[63] Continuation-in-part of Ser. No. 936,358, Aug. 24, 1978, abandoned.

[30] Foreign Application Priority Data

Feb. 8, 1977 [GB] United Kingdom ............... 5035/77
Apr. 12, 1977 [GB] United Kingdom ............. 15004/77

[51] Int. Cl.³ .............................................. G01K 7/00
[52] U.S. Cl. ..................................... 374/183; 73/49.2; 324/71 R
[58] Field of Search ............. 73/362 AR, 362 R, 342, 73/356, 49.2; 324/71 R; 374/183

[56] References Cited

U.S. PATENT DOCUMENTS

| | | | |
|---|---|---|---|
| 2,996,917 | 8/1961 | Christoph | 73/362 R |
| 3,332,280 | 7/1967 | Fish et al. | 73/362 R |
| 3,765,243 | 10/1973 | Pickett et al. | 73/356 |
| 3,864,976 | 2/1975 | Parker | 73/356 |
| 3,914,688 | 10/1975 | Lev | 73/49.2 |
| 3,974,317 | 8/1976 | Sharpless | 73/356 |

FOREIGN PATENT DOCUMENTS

| | | | |
|---|---|---|---|
| 1190671 | 5/1970 | United Kingdom | 73/49.2 |
| 1326752 | 8/1973 | United Kingdom | . |
| 1465515 | 2/1977 | United Kingdom | 73/49.2 |

*Primary Examiner*—Donald O. Woodiel
*Attorney, Agent, or Firm*—Pearson & Pearson

[57] ABSTRACT

A transducer has a chamber containing a substance having a monitorable physical and/or chemical property, for example electrical conductivity, which property changes in correspondence with a change in an external influence, for example, temperature. In one embodiment, the chamber is of elongate form and changes in said monitorable property in any part of the substance along the length of the chamber are monitored by a detection means. In a further embodiment the substance is arranged to undergo an abrupt change in the said property thereof, for example, due to a phase change in the said substance, in response to a predetermined change in the external influence, and detection means is provided to detect such abrupt change.

10 Claims, 4 Drawing Figures

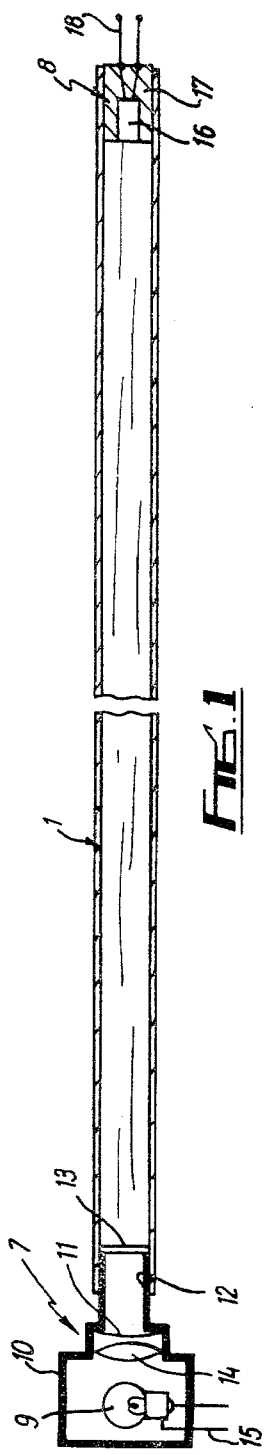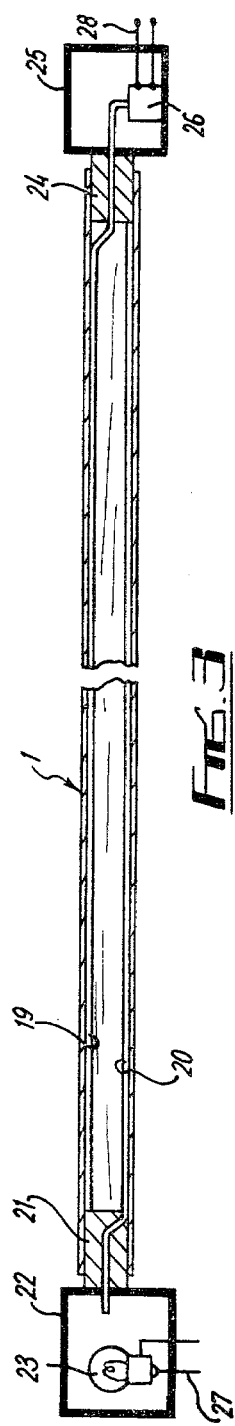

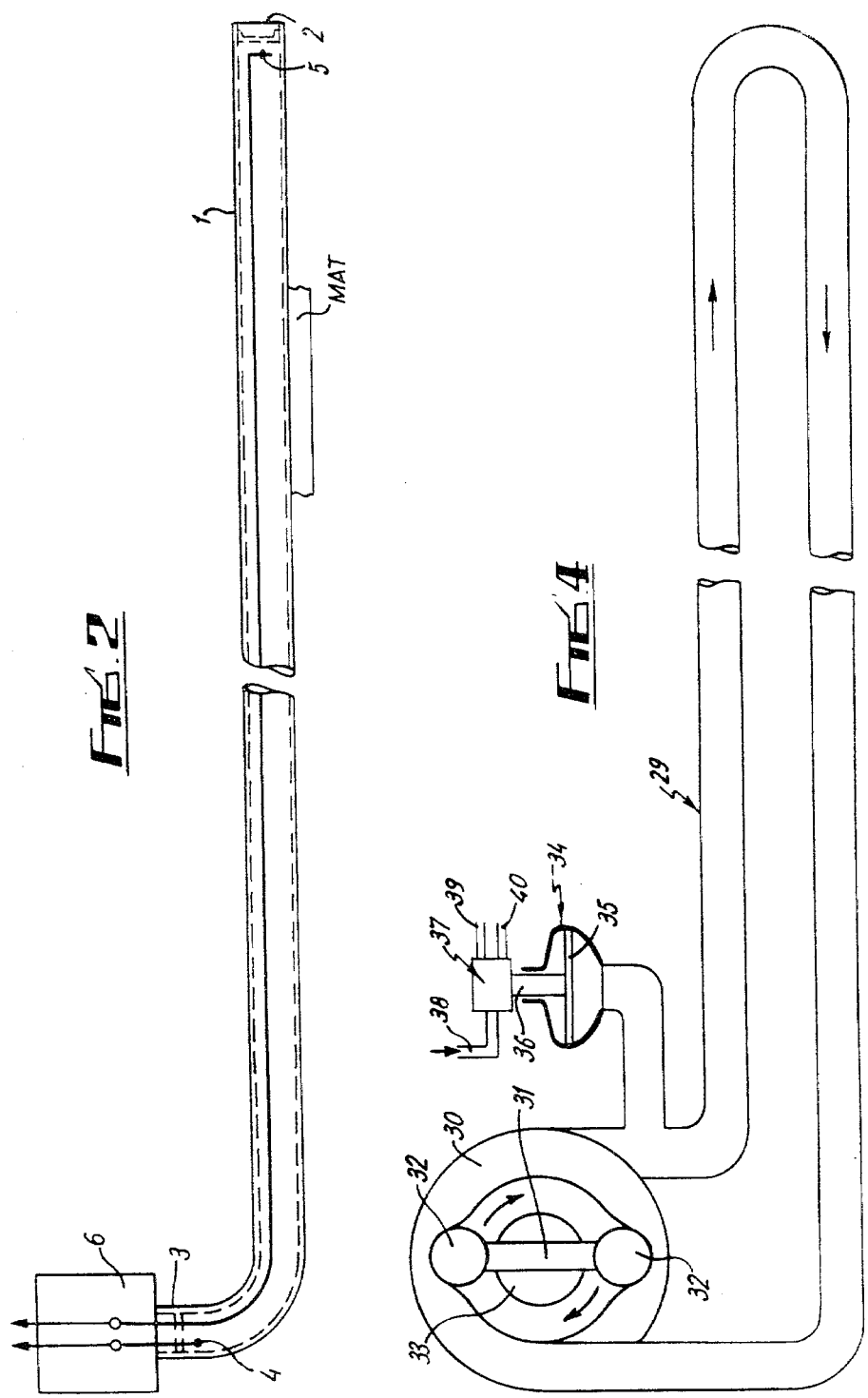

TRANSDUCERS

CROSS REFERENCE TO RELATED APPLICATION

This application is a continuation-in-part of my U.S. Patent Application Serial No. 936,358 filed Aug. 24, 1978 entitled "Transducers", now abandoned.

This invention relates to transducers and is particularly, although not exclusively, concerned with a temperature transducer.

It is desirable to be able to detect leakage of cryogenic liquids from vessels reliably and quickly in order to avoid undue wastage of the liquid and/or damage caused by same. A known method of detecting such leakage involves the use of temperature sensors, such as thermocouples and resistance bulbs, which may be arranged at different positions over the surface of the vessel or in the surrounding area. If, however, the leakage does not occur in the immediate vicinity of a sensor there may be an appreciable time lag before the sensor detects the leakage and in some cases the leakage may not affect the sensor at all due to evaporation of the liquid before reaching the sensor. This problem can be overcome by using many sensors but this is inconvenient and expensive.

An object of the present invention is to provide a transducer which can be used for monitoring a changeable external influence, such as temperature, over a relatively large extent.

According to the invention therefore, there is provided a transducer comprising a chamber containing a substance arranged to extend in continuous manner between two locations in said chamber, the substance having a monitorable physical and/or chemical property adapted to change in correspondence with a change in an external influence to which said chamber is exposed, and a detection means for monitoring said property and sensitive to a change as aforesaid therein in all or a portion of the substance between said locations, the said chamber defining an elongate passage for said substance between said locations.

With this arrangement having regard to the form of the chamber it will be appreciated that a changeable external influence can be readily monitored over a relatively large extent. For example, said chamber may be appropriately formed so that it can be applied in heat exchange relationship with the whole or a major part of a surface of large area.

The chamber may be in the form of a tube or may be of flattened form being defined for example by two closely spaced sheets interconnected at their peripheries and possibly also inwardly of their peripheries to define separate or interconnected compartments. The chamber preferably has flexible walls.

As to the nature of the substance this may take any suitable form, but preferably it is of a liquid or fluent nature so as to conform more readily to the disposition of the chamber especially where such chamber is flexible.

The use of a fluent or liquid substance in a flexible chamber is preferably advantageous for use in monitoring the temperature at the external surface of a large vessel in so far as such chamber can be wrapped around the vessel in contact with the external surface.

With regard to the nature of the physical and/or chemical property of the substance to which the detection means responds this may be of any suitable kind such as, for example, electrical conductivity, dielectric properties, optical properties, radiation transmission properties, fluency, viscosity and the like. Likewise, the change in external influence may be of any suitable nature although it is visualised that the transducer of the invention will be of particular application as a temperature transducer. Thus, the transducer may be used to detect an abrupt fall in temperature as for example where the transducer is to be used to detect leakage of cryogenic liquid from a vessel; or the transducer may be used at an elevated temperature where for example the transducer is to be used to detect cold spots or hot spots on the surface of a boiler. Also, the temperature transducer may be used in a protective capacity, for example, for protecting an enclosure, such as a room against fire, for protecting an enclosure such as a cold room, horticultural enclosure or the like against failure of refrigeration or heating equipment, for protecting a strong room, safe or article from unauthorised entry therein or tampering therewith using thermic lances, blow torches or the like, in which case the detection means responds to a predetermined change in properties of the said substance corresponding to a predetermined change in temperature in order that appropriate warning or remedial action can be taken. In this case, the chamber of the temperature sensitive device may be appropriately shaped and disposed, for example the chamber may be an elongated rigid or flexible tube extending around or along a room, around the periphery of a safe door, or the like. Where, temperature monitoring of a building or large room is to be effected for example for fire warning purposes, there may be a grid of separate, crossing transducer chambers so that the location of an incidence of elevated temperature can be determined. Further, the temperature transducer may also be used for temperature monitoring purposes in relation to a large area or volume, or a number of separate areas and volumes, for example in a horticultural context or in a centrally heated building. In this case, the temperature transducer may be particularly suitable in so far as it can be readily arranged to give a temperature averaging effect, that is the arrangement may be such that the detection means is responsive to an average change in overall physical properties of the said substance.

Instead of monitoring external temperature changes, the transducer of the invention may monitor other influences giving rise for example to a change in the positioning of said chamber and/or physical influences applied to said substance or said chamber.

Thus, the transducer may be used as a position sensitive device for example in analogous manner to a mercury switch in which the said substance may be a conductive liquid and the detection means may be connected to electrodes within the chamber which are bridged or not by the liquid dependent on the position of the chamber. In this case, the detection means may incorporate an appropriate relay, transistor switch or the like.

Alternatively, the transducer may be responsive to a pressure applied internally or externally of the chamber or a force or load applied to the chamber. In this case, the arrangement may be such that there is a change in properties of the substance in response to the increased pressure or loading or such that the change in pressure or loading changes the amount or distribution of the substance in the chamber, for example, the chamber may be deformable whereby a constriction or the like is introduced therein on application of a pressure or loading thereto whereby for example the resistance between two conductors on opposite sides of the restriction and bridged by the substance is increased.

Further, the chamber may have rupturable walls and the detection means may be sensitive to a change in monitored properties of the substance occurring when said substance leaks or escapes through a rupture in the chamber walls. With this arrangement, the chamber may for example comprise a thin flexible plastics bag or plastics tube, or the like, containing said substance in the form of a liquid, and the bag or tube may be arranged in a position in which an unauthorised activity, such as cutting a canvas of a painting from its frame, is likely to rupture the bag or tube.

Still further, the transducer may be a level transducer for use in detecting the level of material to which it is exposed.

The level transducer may take the form of a temperature transducer as hereinbefore referred to in which case said level transducer may have a chamber of elongated form which extends within a container containing a material such as a liquid or fluent particulate material whereby a level indication can be given in terms of a temperature indication, the temperature indication being a function of the proportions of the length of the chamber which are respectively exposed to the material and to the air or other medium above the material.

Alternatively the level transducer may be such that a level indication is given in terms of pressure applied to the chamber or the substance in the chamber by the said material.

The detection means may take any suitable form appropriate to the property of the substance to which it is to respond. Thus, where the property is electrical conductivity, the detection means may comprise electrodes in contact with the substance at different positions in the chamber and connected to a conductivity testing device such as an a.c. or d.c. bridge circuit. Alternatively, the detection means may comprise an optical device which responds to changes in light refraction or transmission through the substance, or the detection means may comprise a pump, for example, a peristaltic pump, which continuously circulates the substance in fluent form through the chamber and responds to any change in viscosity by increasing its power consumption. Also, the detection means may comprise means operable to receive and respond to radiated energy, particularly light or sound waves, passing through said substance, such transmission being modified by change in properties of said substance such as by change in viscosity or production of crystals, bubbles, or other bodies which reflect or deflect the radiation. An ASDIC principle may be used. In each case, the detection means may produce an output signal of electrical form for operating a visual and/or audible warning device and/or an automatic system such as a sprinkler system.

The substance in the chamber may take any suitable form. Where the monitorable property of the substance is its conductivity, the substance may be an electrolyte in the form of a liquid, gel, or paste. Such electrolyte may comprise one or more inorganic compounds in an aqueous medium.

In a second aspect of the invention there is provided a transducer comprising a chamber containing a substance which is arranged to undergo an abrupt change in a physical and/or chemical property thereof in response to a predetermined change in an external influence to which the chamber is exposed, and detection means sensitive to such property of the substance so as to detect any said change occurring in all or a portion of the substance and produce an output signal in response thereto.

The abrupt change in the said property of the substance may be produced as a result of a phase change in the substance, or alternatively, a change in chemical composition, molecular structure or otherwise. In a particular preferred embodiment the abrupt change is a function of the change between liquid and liquid/solid states as for example when a salt crystallises out from a saturated solution of such salt.

In one embodiment of the second aspect of the invention, in the context of the detection of leaks in a vessel containing cryogenic liquid, the transducer has the chamber thereof arranged for application to the outer surface of the vessel and containing a salt solution which is saturated at a temperature just below the normal range of ambient temperature (say at $-20°$ C.), and the detection means is sensitive to the electrical conductivity of the solution. With this arrangement, in the event of a leak, the cryogenic liquid contacts, or is close to a portion of the chamber reducing the temperature thereof and causing salt to crystallise out from the solution at least at that portion of the chamber. The overall conductivity of the substance within the chamber changes abruptly and warning can be given of the leakage. The salt solution may comprise a mixture of water, a substance such as ethylene glycol which prevents freezing at ambient temperature, a further substance such as a mixture of Boric acid and ammonium hydroxide which dissolves in the water and renders same of good electrical conductivity despite the poor conductivity of the glycol, and an ionic salt such as potassium nitrate with which the solution is saturated.

The transducer of the second aspect of the invention may incorporate any feature of the transducer of the first aspect of the invention as appropriate.

The invention will now be described further by way of example only and with reference to the accompanying drawing in which;

FIG. 1 is a diagramatic view of one form of a temperature sensitive device according to the invention;

FIG. 2 is a diagrammatic view similar to FIG. 1 of another form thereof;

FIG. 3 is a diagrammatic view similar to FIG. 1 of still another form thereof: and FIG. 4 is a diagrammatic view similar to FIG. 1 of still another form thereof.

The temperature sensitive device is for use in detecting leakage of cryogenic liquid, such as liquid nitrogen, liquid natural gas or the like, from a vessel containing such liquid.

As shown in FIG. 2, in its preferred form, the device has a chamber 1 defined by a 15 ft length of 1" diameter flexible black plastics tubing which is sealed at both ends 2, 3. The tubing contains an aqueous solution of
ethylene glycol
boric acid
ammonium hydroxide
potassium nitrate The glycol content is such as to ensure that the solution will not freeze at a temperature of $-20°$ C. The boric acid and ammonium hydroxide ensure that the solution has good electrical conductivity irrespective of the potassium nitrate content. The potassium nitrate content is such that the solution is saturated with this salt at −20° C.

The tube 1 is almost completely filled with the solution, a small space being left which is filled with an inert gas (say nitrogen) to accommodate expansion of the solution such as occurs on freezing of same.

Within the tube 1, there are two electrodes 4, 5 terminating in platinum or other corrosion resistant tips which are in contact with the solution at opposite ends of the tube. The electrodes pass through one sealed end 3 of the tube 1 and the electrode 5 which terminates remote from said end 3 is insulated along the length of the tube.

The end 3 of the tube is secured to an electrical junction box 6 and the electrodes 4, 5 are connected to terminals in the box. The terminals in the box are also connected to one arm of a bridge circuit (not shown). The bridge circuit is such that the current flow between the electrodes 4, 5 through the solution is not normally large and/or is of an a.c. nature having a frequency greater than 1000 HZ so as to prevent polarisation problems in the solution. The bridge circuit has an output which is connected to a trigger circuit, or the like, which is arranged to actuate a warning system when the bridge goes appreciably out of balance.

In use, the device is arranged with the tube 1 wrapped around the outer surface of the vessel. The bridge circuit is set so that it is in balance.

In the event that cryogenic liquid leaks from the vessel and contacts or is close to a portion of the tube 1, the temperature of the liquid within such portion will drop rapidly whereby potassium nitrate will suddenly crystallise out from the solution. Removal of the ionic potassium nitrate from the solution, and conversion of the solution to a liquid/solid mixture of high solid content causes the conductivity of the solution as a whole to drop abruptly whereupon the bridge circuit goes out of balance and the warning system is actuated. The warning system may be arranged to operate a warning lamp or bell and/or may operate an automatic sprinkler system in the vicinity of the vessel.

The junction box 6 is well sealed to ensure that there is no danger of electrically igniting leaking inflammable substances.

With the embodiment so far described it will be appreciated that a single device can be used to monitor a large surface area in a simple, convenient and inexpensive manner.

It is, of course, to be understood that the invention is not intended to be restricted to the details of the above embodiment which are described by way of example only.

For example, a smaller bore plastics tube, say ¼" or ⅜" bore may be used. The length of the tube will be selected in accordance with the intended use. Also, the tube may be attached in convoluted form to the surface of a flexible mat which mat is applied to the surface the temperature of which is to be monitored. Where the tube is very long, say over 50 metres, a higher a.c. frequency, say in the MHZ range may be desirable to give a better signal/noise ratio.

Any suitable ionic salts other than those specifically mentioned may be used dependent on ionic mobility, conductivity, and solubility properties. Preferably, one or more salts of Group 1 elements, particularly lithium, sodium, potassium are used and possibly also rubidium, cesium, francium.

As shown in FIG. 1, a tube 1 may have an optical, or other radiation device 7 at one end 3, and a light responsive sensor 8 at the other end 2 for sensing changes in transmission of radiation along the length of the substance in tube 1.

The radiation device 7 comprises an electric lamp 9 mounted within an enclosure 10 having an opening 11 in one side wall. A short tube 12 is connected to this opening 11 and fits firmly in, and is sealed relative to, the end of the tube 1. The end of the tube 12 is sealed with a transparent end cap 13, and a lens arrangement 14 is mounted within the opening 11. The lamp 9 is connected via leads 15 to an electrical supply (not shown) and, when the lamp 9 is switched on, a narrow beam of light passes into and along the tube 1 from the tube 12. This narrow beam of light reaches the light sensor 8 by transmission through the substance in the tube 1, such beam negotiating any bends in the tube 1 by refraction and/or internal reflection from the walls of the tube 1.

The sensor 8 comprises a light sensitive electrical component 16, such as a photoelectric cell or phototransistor, fixed in position in a plug 17 of material which seals the end of the tube 1. The component 16 is connected via leads 18 to a circuit (not shown) which monitors a light-dependent property of the component such as its resistance and responds for example to trigger an alarm circuit when such property changes abruptly as a consequence of an abrupt reduction in the illumination of the component, such reduction occurring when the substance in the tube crystallises and thereby becomes at least partially opaque. The substance in the tube may be the same as that described above in relation to FIG. 2.

With the arrangement of FIG. 3, a tube 1 has two optical fibres 19, 20 (i.e. thin flexible light-transmitting glass strands) secured along its inner surface at diametrically opposite positions.

At one end of the tube 1 the end of one fibre 20 passes through a sealing plug 21 into a housing 22 containing an electrical lamp 23. At the opposite end of the tube 1 the end of the other fibre 19 passes through a sealing plug 24 into a housing 25 containing a light sensor 26.

When the lamp 23 is actuated by connection to an electrical supply via leads 27, light is transmitted along the fibre 20. The tube 1 contains a substance as described above in relation to FIG. 2 and light escaping from the sides of the fibre 20 is transmitted through the substance to the other fibre 19 and via this is transmitted to the sensor 26. When the substance bcomes opaque due to crystallisation the light level reaching the sensor 26 reduces abruptly and an alarm circuit or the like which is connected to the sensor via leads 28 responds appropriately.

The embodiments of FIGS. 1 and 3 may be modified to use other kinds of light sources (e.g. a laser) and also to use other forms of radiation (e.g. ultrasonic radiation).

As shown in FIG. 4 a tube 29 may be a closed loop with a fluent substance therein, such as the substance described in relation to the embodiment of FIG. 2. The loop incorporates a peristaltic pump which comprises a coil 30 of the tube with a rotor 31 having rollers 32 at its ends which press against the coil 30. The rotor can be driven by a motor 33 to effect circulation of the substance continuously through the tube 29.

The motor 33 may be an electric motor although alternatively a hydraulic or pneumatic motor may be used thereby to ensure that electrical circuitry is not used in close proximity to the tube 29.

The pressure in the tube 29 is monitored by a pressure valve 34 comprising a diaphragm 35 exposed to the pressure in the tube 29. If the pressure increases abruptly, as would be the case following crystallisation of the substance in the tube, the diaphragm 35 displaces a movable piston 36 which actuates a switch 37. The switch may be an electric switch although to avoid the use of electrical circuitry, a hydraulic or pneumatic switch with which flow from an inlet 38 is diverted from one outlet 39 to a second outlet 40 may be used. The switch 37 may actuate an alarm or the like as appropriate.

The embodiment of FIG. 4 may be modified to permit use of pumps other than peristaltic pumps. For a positive displacement pump there will be a pressure increase on crystallisation. With other pumps there may be a pressure decrease. Instead of directly monitoring pressure it is possible to monitor pump loading (e.g. a change in current drawn by an electric motor driven pump).

I claim:

1. A temperature monitoring device comprising an elongate chamber in the form of a length of tubing containing a solution which undergoes an abrupt change in a physical property thereof due to crystallisation of a substance out of said solution saturated with said substance in response to a predetermined change in the temperature of all or a portion of said solution, and monitoring means for monitoring said property and sensitive to said abrupt change therein.

2. A temperature monitoring device as specified in claim 1 wherein:
    the abrupt crystallisation of said substance influences radiation along the length of said chamber, by reflection, or deflection; and
    said monitoring means is a radiation device operable to respond to changes in radiated energy passing through said saturated solution.

3. A temperature monitoring device as specified in claim 1 wherein:
    said saturated solution is in fluent form; and
    said monitoring means includes a motor driven pump, continuously circulating said fluent saturated solution along the length of said chamber, and means for sensing any change in viscosity due to abrupt crystallisation of said substance resulting in a change of pressure in said solution.

4. A temperature monitoring device comprising an elongate chamber in the form of a length of flexible tubing, containing electrodes at opposite ends thereof and an electrically conductive medium extending between said electrodes, said medium comprising a saturated solution of an electrolyte the electrical conductivity of which undergoes an abrupt fall due to crystallisation of said electrolyte out of the solution in response to a predetermined fall in the temperature thereof, and an electrical detection means including an a.c. bridge circuit for monitoring the conductivity between said electrodes so as to produce an electrical output in response to detection of a conductivity change due to occurrence of said predetermined change in the temperature of said medium at any position along the length of the chamber.

5. A temperature monitoring device of the type comprising an elongated, hollow tube having opposite sealed ends defining a chamber therebetween; a pair of electrodes, each at an opposite end of said tube within said chamber, said electrodes forming part of an electrical monitoring circuit and a medium filling said chamber which changes its electric conductivity in response to a change in temperature, characterized by:
    said electrodes having non-corrosive tips of platinum;
    said tube being formed of flexible black, thin walled, plastic tubing of small bore;
    and said medium being an aqueous ionic salt solution saturated with potassium nitrate, normally in liquid state, at $-20°$ C., but subject to abrupt, sudden crystallisation of salts out of said solution in response to a reduction of temperature to thereby trigger said monitoring circuit.

6. A sensor as specified in claim 5 wherein:
    said chamber in addition to said aqueous ionic salt solution includes a small volume filled with an inert gas such as nitrogen.

7. A sensor as specified in claim 5 wherein:
    said aqueous ionic salt solution includes ethylene glycol, boric acid, ammonium hydroxide and said potassium nitrate.

8. A sensor as specified in claim 5 wherein:
    the ionic salt in said aqueous solution is selected from lithium, sodium or potassium.

9. A sensor as specified in claim 5 plus:
    a flexible mat attachable on the surface of a cryogenic tank, said elongated flexible temperature sensor being convoluted on, and attached to, said flexible mat.

10. A sensor as specified in claim 5 wherein:
    said flexible tubular body includes a flexible conductor extending from one of said electrodes at one end thereof, with said chamber, to the other said end thereof.

* * * * *